(12) United States Patent
Midkiff

(10) Patent No.: US 6,895,978 B2
(45) Date of Patent: May 24, 2005

(54) APPARATUS FOR WASHING VEHICLE TIRES AND WHEELS

(76) Inventor: David G. Midkiff, 3723 Prosperity Ave., Fairfax, VA (US) 22031

( * ) Notice: Subject to any disclaimer, the term of this patent is extended or adjusted under 35 U.S.C. 154(b) by 370 days.

(21) Appl. No.: 10/223,015

(22) Filed: Aug. 19, 2002

(65) Prior Publication Data

US 2004/0031505 A1 Feb. 19, 2004

(51) Int. Cl.[7] .................................................. B08B 3/04
(52) U.S. Cl. ........................ 134/104; 134/123; 134/135; 134/186
(58) Field of Search .............................. 134/186, 104.4, 134/123, 135

(56) References Cited

U.S. PATENT DOCUMENTS

| | | | | | |
|---|---|---|---|---|---|
| 1,479,841 | A | * | 1/1924 | Stover .......................... | 15/53.4 |
| 3,425,427 | A | * | 2/1969 | Andersen ........................ | 134/6 |
| 3,745,932 | A | * | 7/1973 | Czerwinski .............. | 104/172.3 |
| 3,903,559 | A | * | 9/1975 | Kuster et al. ................. | 15/53.4 |
| 4,917,125 | A | * | 4/1990 | Midkiff ....................... | 134/123 |
| 4,979,536 | A | * | 12/1990 | Midkiff ....................... | 134/123 |
| 5,261,433 | A | * | 11/1993 | Smith .......................... | 134/123 |
| 5,341,828 | A | * | 8/1994 | Ferguson, Sr. .............. | 134/123 |
| 5,454,391 | A | * | 10/1995 | Cheung et al. ............. | 134/123 |
| 5,730,164 | A | * | 3/1998 | Midkiff et al. ........... | 134/104.2 |
| 5,860,180 | A | * | 1/1999 | Heise .......................... | 15/88.2 |
| 6,358,330 | B1 | * | 3/2002 | McGraw ....................... | 134/34 |
| 6,655,396 | B2 | * | 12/2003 | Krenzel .................... | 134/104.1 |

FOREIGN PATENT DOCUMENTS

| | | | |
|---|---|---|---|
| GB | 1442258 | * | 7/1976 |
| GB | 2374798 | * | 10/2002 |
| JP | 52-44071 | * | 4/1977 |
| JP | 57-74252 | * | 5/1982 |
| JP | 57-172858 | * | 10/1982 |
| JP | 58-30853 | * | 2/1983 |

* cited by examiner

Primary Examiner—Frankie L. Stinson
(74) Attorney, Agent, or Firm—Walter D. Ames, Esq.

(57) ABSTRACT

Apparatus for washing the wheels and tires of heavy duty vehicles includes a wash trough in which the wheels and tires are washed, and a refuse trough in which refuse from the vehicles is deposited for facile removal. The troughs are separated by a wall having a space therein through which debris from the wash trough is impelled, by a stream of water into the refuse trough.

18 Claims, 2 Drawing Sheets

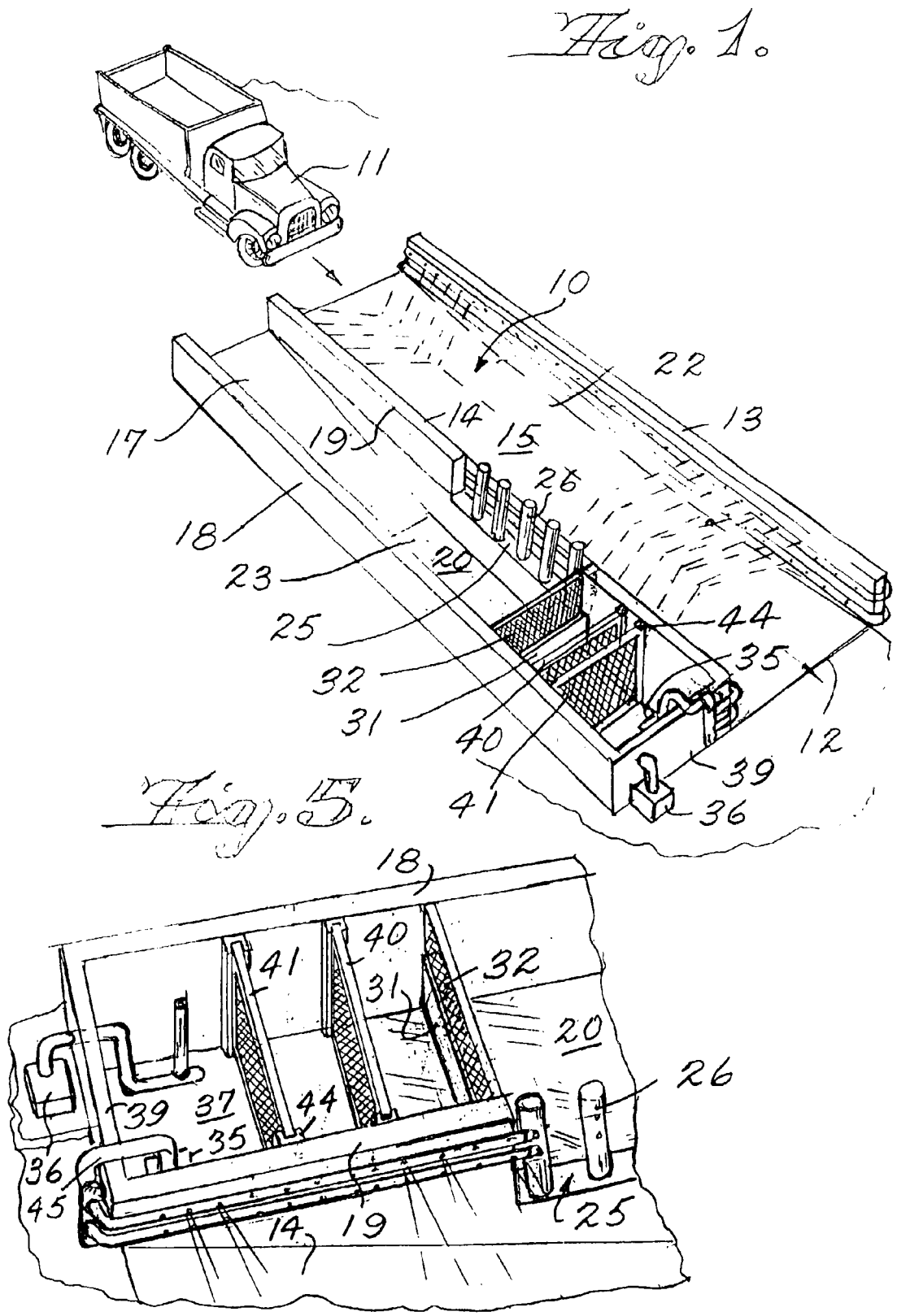

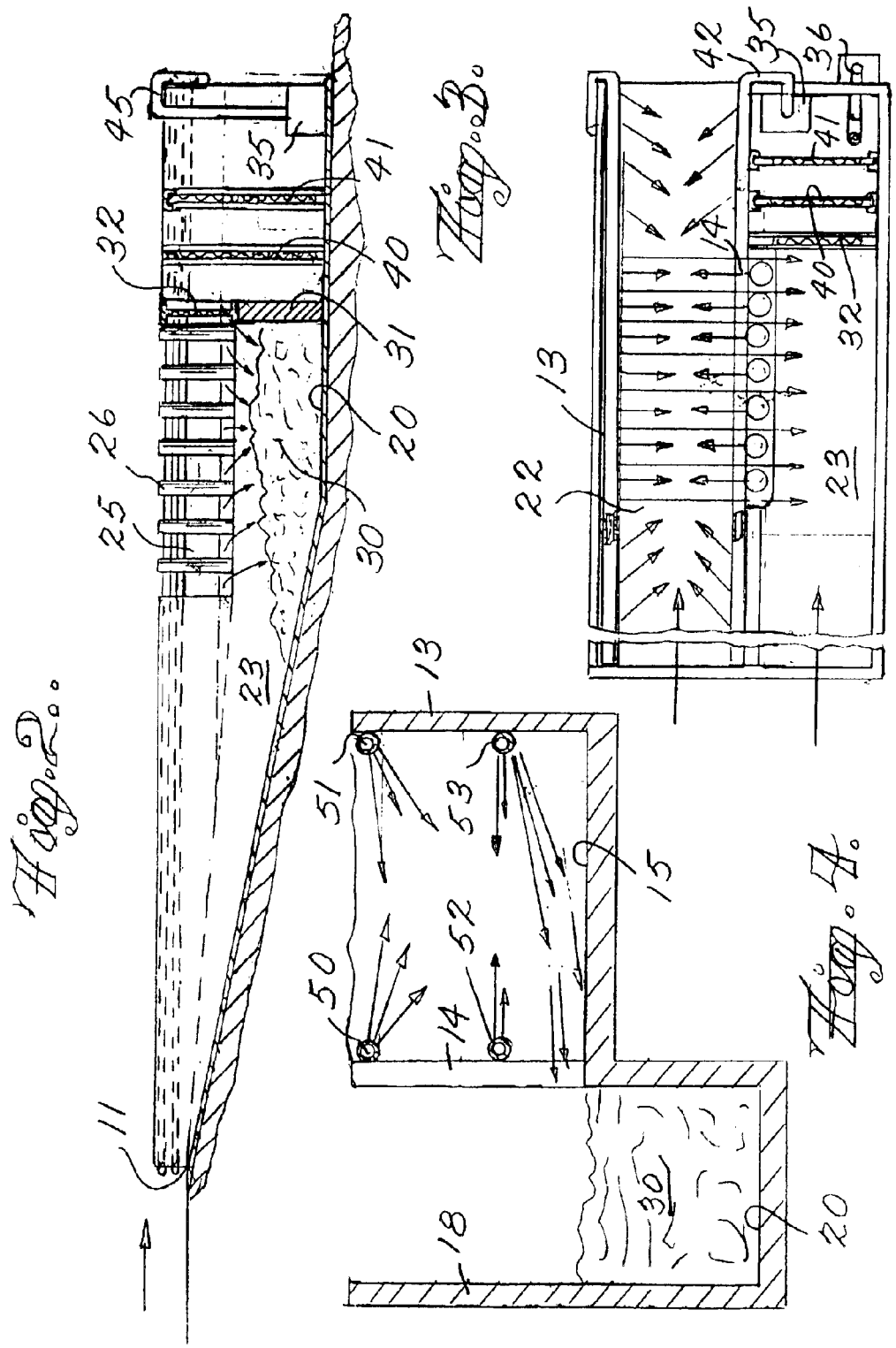

APPARATUS FOR WASHING VEHICLE TIRES AND WHEELS

BACKGROUND OF THE INVENTION

1. Field of the Invention

The present invention relates generally to apparatus for washing vehicles. More specifically, it concerns apparatus for washing the wheels and tires of heavy duty vehicles that have accumulated mud and debris on their wheels, tires and undercarriages, which material should be washed from the vehicles prior to their utilization of public roads.

2. Description of Prior Art

The prior art that is deemed to be relevant to the present invention is represented by prior patents that have issued in my name as inventor. Those patents are U.S. Pat. Nos. 5,730,164, issued May 24, 1998, and 4,917,125, issued Apr. 17, 1990. More recently, on Apr. 16, 2001 I filed an application entitled, Vehicle Tire and Wheel Washing Apparatus, which is identified by application Ser. No. 09/834,862. Each of these patents discloses an elongated trough having entrance and exit ramps through which a heavy duty vehicle passes to have debris removed from its wheels and tires.

While each of these two patents and pending application has the same general object—the removal of debris from heavy duty vehicles and the disposal of that debris after it has been washed from the vehicles—they accomplish their functions in different manners and with different degrees of efficacy. Thus, in the two patents the washing apparatus is configured so that a mesh grating is positioned over the bottom of the trough and the vehicle, e.g., a truck, drives onto the grating where it is subjected to wash sprays to remove debris, which falls through the grating and into the bottom of the trough. After there has been an accumulation of debris, passage of trucks into the washing apparatus must cease while the grating is pivoted out of its horizontal, vehicle supporting position and the debris is manually removed. While the apparatus disclosed in those patents certainly accomplishes its function, it will be apparent that halting a line of trucks that have, for example, just left an excavation site that is muddy from a recent rain, is not an economic decision, as the trucks and their drivers will be costing a considerable sum while they wait in line. Further, subjecting a mesh grating to the continual passage of heavy vehicles subjects that grating and its supports to considerable stress, and when the grating or one of its supports collapses when a truck is in the trough, the result can be catastrophic, presenting the problem of damage to the truck and the washing apparatus, injury to the driver, and how to remove the vehicle from the apparatus without further damaging all of them.

My pending application overcomes the difficulties encountered in the use of mesh gratings on which a vehicle is suspending. In that application a vehicle tire and wheel washing apparatus is disclosed in which debris is removed by other means and that debris flushed from the system, and then pumped through a drainage pipe to a unit that separates the debris from the wash water. While this is an efficient system, and while it can be operated on a continuing basis so that a long line of vehicles can be washed without having the line stopped to effect removal of accumulated trash, the use of an individual tank that separates liquid and solid materials from the tank is expensive and in some cases cannot be cost justified, no matter how effective the apparatus is in accomplishing its intended purpose.

Thus, in some instances, despite my prior inventions, there is still a need for apparatus economically and continuously to wash the wheels and tires of trucks. That need is made self-evident when one watches a stream of trucks leave a construction site after a rain and leave a trail of dirt and debris on the road for a considerable distance. Such trail is not only offensive to the eye, but can present a real hazard to motorists, bicyclists and pedestrians who must use that road.

It is, therefore, a prime object of the present invention to provide a tire and wheel washing apparatus that will be continuous in operation and which will not have to cease operation while accumulated debris and dirt are periodically removed from the equipment.

It is another object of my invention to accomplish that prime objective in an economic and efficient manner, and to do so by the use of a single piece of equipment without the requirement of separate equipment for filtering liquids and solids removed from the floor of the wash trough.

It is still another object of my invention to provide a tire and wheel washing apparatus in which wash water is recycled so that the loss of water used in the washing process will be maintained at a minimum.

SUMMARY OF THE INVENTION

In its basic form, the present invention comprises an elongated tank having, at either end, an entrance at which trucks enter, and an exit at which trucks leave the tank. The entrance and exit are in the form of ramps that are joined to a centrally located trough in which washing of the vehicle tires and wheels is primarily accomplished. Additionally, another trough is positioned substantially contiguous with the wash trough, and that other trough has for its function to accept debris and wash water from the trucks being washed. In order to effect that function, the refuse trough and the wash trough may be located contiguous with each other; preferably they have a side wall in common.

The shared side wall of the wash trough and the refuse trough has at least one aperture formed in it, and it is through this aperture or space that debris from the wash trough passes into the refuse trough, along with wash water used to spray the wheels and tires of the vehicle, and water used to propel the debris across the bottom of the wash trough and into the aperture. In a preferred embodiment, the wash water and debris that are impelled into the refuse trough flow downwardly in a general direction parallel to the exit ramp of the tank due to an incline in the bottom of the refuse trough. There the debris impacts means in the refuse trough that inhibits the passage of debris along the downward slope of the trough but without substantially inhibiting the flow of wash water past such means.

According to the best mode of the invention, a push block or wall is positioned across the bottom of the refuse trough, and forms a barrier to the passage of debris. However, the push block permits the passage of wash water over the top of the block, and a foraminous filter is located atop the push block to inhibit the passage of debris past the push block along with the overflowing waste water. It is preferred that there be at least one additional filter located downstream of the push block to trap debris that bypasses the first filter located atop the push block. Debris lodged on the forward side of the push block can be removed by mechanical means, such as a front-end loader. Wash water in the chamber behind the block is pumped from the chamber and, most advantageously, recirculated back to the wash trough where it is sprayed on a truck's wheels and tires or used to propel debris into the space in the common wall between the wash and refuse troughs.

These and other objects, features and advantages of the present invention will become more readily apparent from the following, detailed description of a preferred embodiment of my invention, which description is written in conjunction with the annexed drawings that form a part hereof and in which:

BRIEF DESCRIPTION OF DRAWINGS

FIG. 1 is a perspective view of the entire apparatus of the invention;

FIG. 2 is a side elevational view of the refuse ramp and trough, with a portion of the outer wall of the trough removed;

FIG. 3 is a fragmentary top plan view of the apparatus;

FIG. 4 is an enlarged detail of the troughs of the apparatus, diagrammatically presented, and FIG. 5 is a perspective view of a detail of the refuse tank of the invention.

DETAILED DESCRIPTION OF PREFERRED EMBODIMENT

Referring now to the drawings, and in particular to FIG. 1 thereof, the apparatus of the invention comprises an elongated tank, indicated generally by arrow 10, through which a truck 11 or other vehicle passes to have its tires, wheels or undercarriage washed. The vehicle 11 enters the tank 10 at an entrance ramp 11, passes through the wash trough 22 and over the bottom 15 of the tank, and exits at a ramp 12. Usually the entrance ramp. 11 is on a downgrade into the wash trough an d the exit ramp 12 is at an upgrade leaving the tank.

The central portion of the tank 10 is circumscribed by the bottom 15 and opposed side walls 13 and 14. At such central portion the side walls and bottom wall of the tank form a wash trough, indicated generally by reference numeral 22. For the purposes of the present invention, it is preferred that bottom wall 15 of wash trough 22 be substantially flat and lie in a horizontal plane, although it may be found advantageous for the bottom 15 to have a slight slope downward in the direction of the exit ramp 12.

Extending substantially parallel to the path formed by the ramps 11 and 12 and bottom 15 is another path formed by a depending ramp 17, a bottom 20 and parallel side walls 18 and 19. Those side walls and bottom 20 form a refuse trough 23, which lies on the opposite side of the intervening side wall from the wash trough 22.

With respect to the side walls that form part of the troughs 22 and 23, it is preferred that those side walls 14 and 19 be formed as a single unit. Thus, as shown in FIG. 1, only a single wall 14, 19 is shown. However, it will be apparent that such walls can be formed independently and either joined along their lengths or even spaced apart a slight distance. What is important about the side wall 14, 19 is that it be formed with a laterally extending space, illustrated generally by reference numeral 25 and here shown interrupted by bollards 26, which act to prevent large objects from passing through space 25. As best seen in FIG. 2, the space 25 is configured so that it terminates downwardly at the approximate level of the bottom 15 of the wash trough 22. However, it may be found advantageous to have bottom wall 15 at a level somewhat below or somewhat above the lowermost extension of space 25. Of course, the space 25 is well above bottom 20 of refuse trough 23.

The structure of the interior end of refuse trough 23 forms one aspect of the present invention. As will be apparent from FIG. 5 of the drawings, the refuse trough 23 terminates at one end in a push block 31, at which refuse 30 accumulates. See FIG. 2. While push block 31 extends completely across the bottom 20 of refuse trough 23, its height is limited. In the embodiment illustrated in FIG. 5 of the drawings, push block 31 terminates upwardly and is surmounted by a filter 32 in the form of a wire mesh screen that extends upwardly from the top of the push block. Thus, water and debris that flow into contact with push block 31 will have the debris trapped against the solid wall presented by the push block, while water and, perhaps, some less extensive debris will flow through the mesh screen 32 and further along the refuse trough 23. There such wash water and debris will be held against or pass through secondary filter 40 and then tertiary filter 41, which act to progressively remove sediment from the wash water.

It is to be emphasized that secondary and tertiary filters 40 and 41 extend their full height and are not mounted atop any push block. There is only one push block contemplated, and that is block 31 As presently devised, the push block 31 has a height of approximately three feet, and the filter 32 mounted on the upper wall of the push block extends upwardly for another three feet. Also, it is believed advisable that the secondary and tertiary filters 40 and 41 be formed from a progressively finer mesh that the filter 32, so that more and finer debris will be removed from the wash water as it flows down the refuse trough. Most preferably filters 40 and 41 are mounted in grooved frames, indicated at 44, so that they can be lifted from their vertical positions should the need arise. The filters can be formed from wire mesh, and the filters can be limited or expanded in number from the preferred embodiment illustrated. However, the main body of refuse will remain positioned against the push block 31 until it has been removed.

Also shown in FIG. 5 is a submersible pump 35, usually embodying a screen to filter out refuse, and a heater 36 to heat any water that may be in a frozen condition. Pump 35 is located in a chamber 37 formed behind the refuse trough 23 and bounded by the push block 31 and filters 40 and 41, side walls 18 and 19, and an end wall 39. As shown, heater 36 is located behind end wall 39 and has a heating conduit 42 extending horizontally through an aperture in end wall 39 and terminating in an upwardly extending vent pipe 43.

The mode in which wheel and tires of a heavy duty vehicle 13 are washed is illustrated diagrammatically in FIGS. 3 and 4. It will there be seen that spray nozzles of a conventional pipe structure are mounted on the outer wall 13 ad well as the inner wall 14 of the elongated tank 10. It is preferred that there be two levels of pipes: pipes 50 and 51 mounted on the inside surfaces of the side walls 13 and 14, respectively, and pipes 52 and 53 mounted on the inner surfaces of those side walls at a level lower than the pipes 50 and 51. From FIG. 4 it will be seen that a spray of wash water is directed against the wheels, tires and undercarriage of a truck by nozzles in all four spray pipes 50, 51, 52, and 53 and a large variety of sprays will be adequate for this purpose. However, spray pipe 53 mounted at the inner surface of outside side wall 13 performs an additional function: it sprays water in a lower trajectory so that, rather than washing the vehicle, the spray impels refuse through space 25 and into refuse trough 23.

In the practice of my presently preferred embodiment, a truck 13 prepares to enter the elongated tank 10 to have its wheels and tires freed from mud and grime. It proceeds down the entrance ramp 1i, where it receives a preliminary spraying, and then to the wash trough 22, where it stands on substantially flat bottom 15 between the opposed side walls 13 and 14 of the trough. There its wheels, tires and undercarriage are sprayed with wash water through nozzles in upper pipes 50 and 51 and lower pipe 52. While there may also be a washing spray from nozzles in lower pipes 53, jets from those pipes direct wash water and refuse from the bottom 15 of wash trough 22 and through the space 25 between bollards 26 in side wall 14.

Refuse 30 washed from the bottom 15 of wash trough 22 passes into the refuse trough 23 and accumulates on the bottom 20 of that trough By gravity refuse 30 accumulates against push block 31, while the wash water that carries the refuse into the refuse trough 23 passes through the mesh filter atop the push block, then through the secondary and tertiary mesh filters 40 and 41 and into the chamber 37. There it enters submersible pump 35, where it is screened to remove additional entrained refuse. Wash water is then pumped by pump 35 through piping 45 back into the tank 10, where it is used to spray wash mud and grime from vehicles, as through pipes 51 and 53, and/or to impel trash from the vehicles across bottom 15 and into refuse trough 23. Should the weather be so cold that it is deemed advisable to heat the wash water, that heating is accomplished by heater 36, which pumps hot air through heater pipe 42 in chamber 37 where that pipe is in contact with wash water that has flowed into chamber 37. Waste heat is released to the atmosphere through vent 43.

After the truck 13 has moved across the bottom 15 of wash trough 22 and had its wheels and tires washed, it then proceeds up the ramp 12 and out the tank 10. With regard to refuse 30 that has accumulated at the push block 31, such refuse is removed periodically either by manual means or by a machine adapted for the purpose, e.g., a front end loader. Thus, the washing of heavy duty vehicles and the removal of refuse from those vehicles can take place at the same time, or the removal of refuse can be timed to occur when the apparatus is not in use cleaning vehicles. In either case, the apparatus, which is preferably formed in major part from concrete, is simple to operate and can handle a series of trucks without shutting down. As the trucks only roll on concrete, wear on the apparatus is minimized, and as there are no grates to be pivoted or like moving parts, breakdowns of the apparatus are a rare occurrence. Additionally, water usage is minimized because of the recycling feature of the apparatus.

It will be recognized by those of skill in this art that many changes can be made in the preferred embodiment described in detail hereinbefore without departing from the spirit of my invention. For example, rather than simply having the push block surmounted by a filter, the block can be spaced from one or both of the side walls of the refuse trough and, optionally, filters can be inserted in the spaces so formed. As to all such apparent modifications and alterations, it is desired that they be included within the purview of my invention, which is to be limited only by the scope, including equivalents, of the following, appended claims.

I claim:

1. Apparatus for removing debris from and washing the wheels and tires of a vehicle, comprising:

an elongated tank having spaced, opposed side walls and a bottom, and terminating at one end in a vehicle entrance ramp and at the other in a vehicle exit ramp, said ramps being joined to a centrally located wash trough whereby a vehicle carrying debris on its exterior enters and exits said wash trough by said ramps and passes through said trough where debris is removed from said vehicle and deposited in said wash trough;

a refuse trough having spaced, opposed side walls and a bottom and being juxtaposed in relation to said wash trough, said bottom of said refuse trough being located at a level beneath that of said bottom of said wash trough;

said refuse trough and said wash trough sharing a side wall, said shared side wall being formed with at least one space therein to permit the passage of debris therethrough, and means located at said wash trough for impelling debris washed from said vehicle toward said shared side wall and through said space therein into said refuse trough.

2. Apparatus as claimed in claim 1, in which said at least one space in said shared side wall is at the approximate level of said bottom of said wash trough but substantially above said bottom of said refuse trough.

3. Apparatus as claimed in claim 1, in which said at least one space is a plurality of spaces formed by bollards spaced from each other and extending vertically in the plane of said shared side wall.

4. Apparatus as claimed in claim 1, in which said at least one space in said shared side wall is a horizontally elongated aperture terminating downwardly substantially at said wash trough bottom.

5. Apparatus as claimed in claim 1, in which said wash trough includes means for spraying wash water at the wheels and tires of said vehicle as it passes through said trough.

6. Apparatus as claimed in claim 1, in which said means for impelling debris includes a water spray located in said wash trough side wall opposed to said shared side wall.

7. Apparatus for removing debris from and washing the wheels and tires of a vehicle, comprising:

a first elongated tank having spaced, opposed side walls and a bottom, and terminating at one end in a vehicle entrance ramp and at the other in a vehicle exit ramp, said ramps being joined to a centrally located wash trough whereby a vehicle carrying debris on its exterior enters and exits said wash trough by said ramps and passes through said trough where debris is removed from said vehicle and deposited in said wash trough;

a second elongated tank positioned contiguous with and parallel to said first tank and having an entrance ramp and a refuse trough having spaced, opposed side walls and a bottom and being juxtaposed in relation to said wash trough, said bottom of said refuse trough being located at a level beneath that of said bottom of said wash trough;

said refuse trough and said wash trough sharing a side wall, said shared side wall being formed with at least one space therein to permit the passage of debris and wash water therethrough, and means located in said refuse trough to inhibit the passage of debris in a downstream direction away from said entrance ramp of said second tank.

8. Apparatus as claimed in claim 7, in which said last named means is a push block against which debris accumulates.

9. Apparatus as claimed in claim 8, in which said push block extends between said opposed side walls of said refuse trough so that debris is trapped before said push block.

10. Apparatus as claimed in claim 9, in which a first filter is mounted atop said push block so that debris carried by said wash water will be inhibited from passing through said filter as wash water passes over said push block and through said first filter.

11. Apparatus as claimed in claim 10, in which there is at least one additional filter located downstream of said push block.

12. Apparatus as claimed in claim 7, further including a chamber formed in said second tank behind said push block, said chamber forming a reservoir in which wash water that passes over said push block accumulates.

13. Apparatus as claimed in claim 12, further including means in said chamber for removing wash water therefrom.

14. Apparatus as claimed in claim 13, in which said means for removing wash water is a pump.

15. Apparatus as claimed in claim 12, in which said pump directs wash water from said chamber back to said wash trough.

16. Apparatus as claimed in claim 12, further including means for heating said wash water in said chamber.

17. Apparatus for removing debris from and washing the wheels and tires of a vehicle, comprising:
- a first elongated tank having spaced, opposed side walls and a bottom, and terminating at one end in a vehicle entrance ramp and at the other in a vehicle exit ramp, said ramps being joined to a centrally located wash trough whereby a vehicle carrying debris on its exterior enters and exits said wash trough by said ramps and passes through said trough where debris is removed from said vehicle and deposited in said wash trough;
- a second elongated tank positioned contiguous with and parallel to said first tank and having an entrance ramp and a refuse trough having spaced, opposed side walls and a bottom and being juxtaposed in relation to said wash trough, said bottom of said refuse trough being located at a level beneath that of said bottom of said wash trough;
- said refuse trough and said wash trough sharing a side wall, said shared side wall being formed with at least one space therein to permit the passage of debris therethrough,
- means located at said wash trough for directing wash water at the wheels and tires of said vehicle;
- means located at said wash trough for impelling debris washed from said vehicle toward said shared side wall and through said at least one space therein into said refuse trough;
- means located in said refuse trough to inhibit the passage of debris in a downstream direction away from said entrance ramp of said second tank but to permit the passage of water in said direction;
- a chamber forming a reservoir in said second tank behind said means to inhibit, said wash water accumulating in said reservoir, and
- a pump in said chamber for impelling said accumulated water back to said wash trough and to said means for directing wash water or to said means for impelling debris, located in said wash trough.

18. Apparatus as claimed in claim 17, in which said inhibiting means is a push block positioned across said bottom of said refuse trough and forming a barrier to the downstream passage of said debris.

* * * * *